(No Model.)
H. PERLICH.
INSECT DESTROYER.
No. 273,144. Patented Feb. 27, 1883.
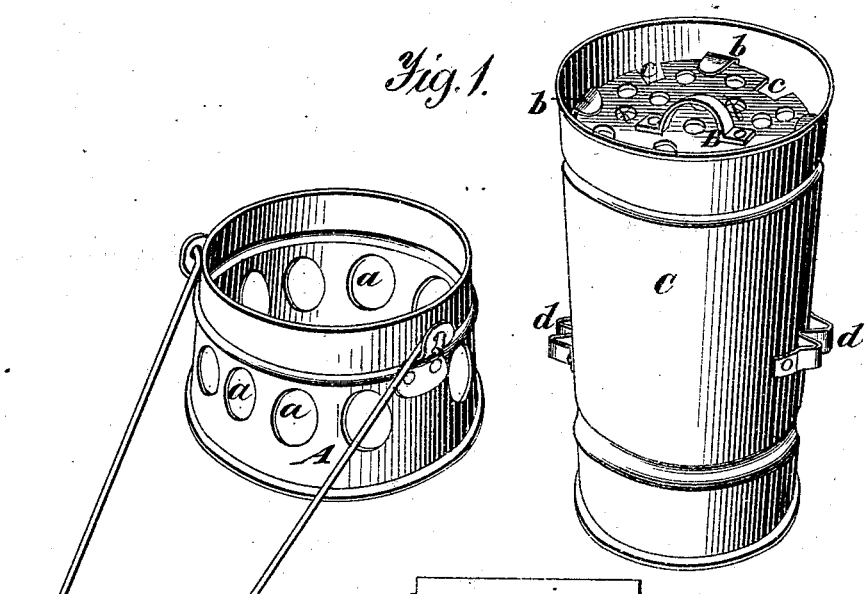
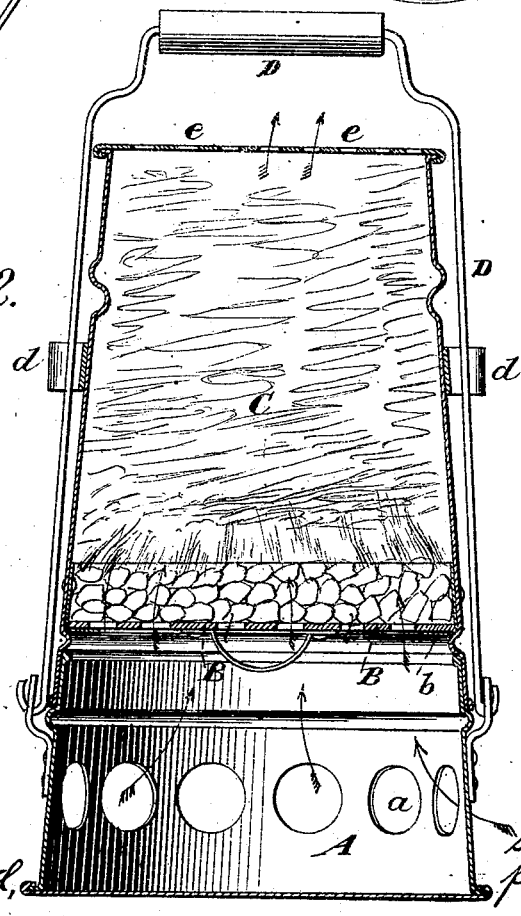
Witnesses.
A. Ruppert
B. A. Lockwood
Inventor.
Hermann Perlich
per Wm. H. Harrison
Attorney

UNITED STATES PATENT OFFICE.

HERMANN PERLICH, OF BALTIMORE, MARYLAND.

INSECT-DESTROYER.

SPECIFICATION forming part of Letters Patent No. 273,144, dated February 27, 1883.

Application filed September 26, 1882. (No model.)

*To all whom it may concern:*

Be it known that I, HERMANN PERLICH, a citizen of the United States, residing at No. 183 South Broadway, in the city of Baltimore, State of Maryland, have invented a new and useful Florist's Fumigator or Insect-Destroyer, of which the following is a specification.

Figure 1 is a view of the base and body detached in perspective, the body being inverted. Fig. 2 is a vertical sectional view.

My invention relates to improvements in the florists' fumigators or insect-destroyers; and the objects of my improvements are, first, to secure sufficient draft entirely round the fumigator, so that all the material used will burn readily; second, to provide a bottom for the fumigator so constructed as to prevent its heating, and so as to prevent its burning or otherwise injuring any material or texture on which it may stand while lighted; third, to afford the means of lighting damp material by means of a few hot coals applied at the bottom of the material, yet above the bottom of the fumigator; and, fourth, to arrange a handle by which the fumigator can readily and securely be carried in one hand even while lighted. I attain these objects as follows, viz:

The lower part or section, A, of the fumigator (the bottom proper) is provided with drafts $a\ a$ around its entire circumference, and the false bottom or grate B is also provided with sufficient holes $f\ f$ to make the draft sure and rapid. The bottom proper, A, is separated from the main body of the fumigator C, and they are put together by a slip-joint. Below this joint, midway between the top and bottom of the bottom proper, are the holes for draft, and below these holes the device will not heat, while any waste falling from the false bottom or grate is caught and retained in the bottom proper. The main part of the fumigator is taken off the bottom and turned upside down when it is to be filled, (see $c$ in Fig. 1,) the hot coals are placed upon the material, the false bottom or grate is pressed in on top of the coals, the notches $c\ c$ registering with the catches $b\ b$, and securely attached by turning the false bottom either to the right or left, and then the fumigator is placed in position on the bottom proper, as in Fig. 2. The material (tobacco-stems being generally used) should be somewhat damp to have the desired effect.

The handle of the fumigator, D, is attached to the bottom proper, and may be left down while the material is burning, as in Fig. 1. On the side of the fumigator, opposite each other, are two catches, $d\ d$, into which the handle is to be placed when it is to be carried or when not using.

What I claim as my invention, and desire to secure by Letters Patent, is—

The fumigator described, consisting of removable base A, having holes $a$ and carrying-bail D, body C, having perforated top and catches $d\ d$ and $b$, and grate B, having notches $c$, as set forth.

HERMANN PERLICH.

Witnesses:
LUDWIG DIEHL,
CHAS. LUEBBECKE.